United States Patent [19]

Snider et al.

[11] Patent Number: 4,670,677
[45] Date of Patent: Jun. 2, 1987

[54] ELECTRIC MOTOR WITH SHROUDED FAN

[75] Inventors: S. Duke Snider; Kevin M. May, both of St. Louis, Mo.

[73] Assignee: Emerson Electric Co., St. Louis, Mo.

[21] Appl. No.: 855,956

[22] Filed: Apr. 25, 1986

[51] Int. Cl.$^4$ .............................................. H02K 9/06
[52] U.S. Cl. ........................................ 310/63; 310/60 R; 310/68 D; 416/182
[58] Field of Search ............. 310/52, 60 R, 63, 68 D; 415/216, 219 R; 416/189 R, 192, 182

[56] References Cited

U.S. PATENT DOCUMENTS

| | | | |
|---|---|---|---|
| 1,986,867 | 1/1935 | Walsh | 416/189 R |
| 3,512,024 | 5/1970 | Papa | 310/63 |
| 3,648,086 | 3/1972 | Renner et al. | 310/63 |
| 3,916,231 | 10/1975 | Cathey | 310/89 |
| 4,492,885 | 1/1985 | Kitamura et al. | 310/68 D |

FOREIGN PATENT DOCUMENTS 40903  9/1929  Denmark ................... 416/189 R

Primary Examiner—Patrick R. Salce
Assistant Examiner—D. L. Rebsch
Attorney, Agent, or Firm—Polster, Polster & Lucchesi

[57] ABSTRACT

An electric motor has stator coils extending longitudinally past an end of its rotor so that the end turns and at least a portion of the inner side of the stator coils are exposed. A fan is disposed inside the motor shell between a first air passageway and the stator coils. The fan is secured to and driven by the rotor shaft to cause a flow of cooling air to pass over the stator coils when the motor is in operation. The fan has a number of vanes extending outwardly from a hub to a circumferential ring, which ring defines a central opening of the fan. The central opening extends past the vanes from the front to the rear of the fan so that the rear of the fan is relatively open. The inner surface of the ring is smoothly curved outwardly and rearwardly from the front of the central opening to direct air which enters the central opening toward the stator coils. The vanes are disposed adjacent the exposed portions of the stator coils to cause turbulent air flow along the exposed portions.

6 Claims, 4 Drawing Figures

U.S. Patent  Jun. 2, 1987  4,670,677
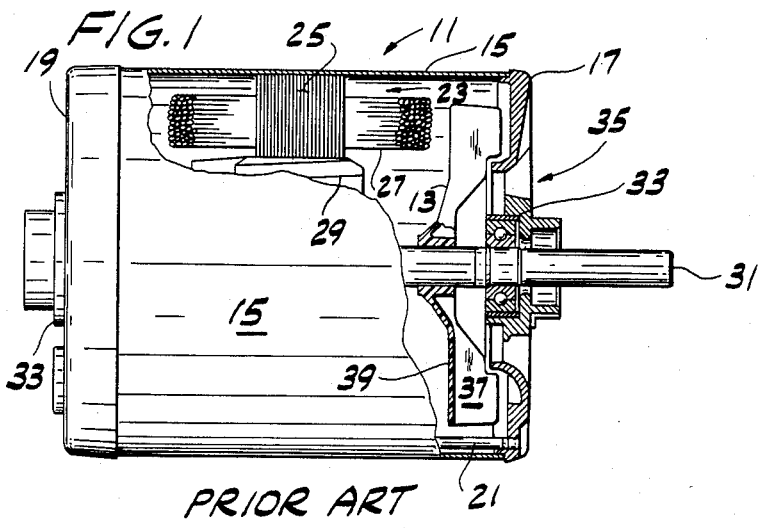
FIG. 1 — PRIOR ART
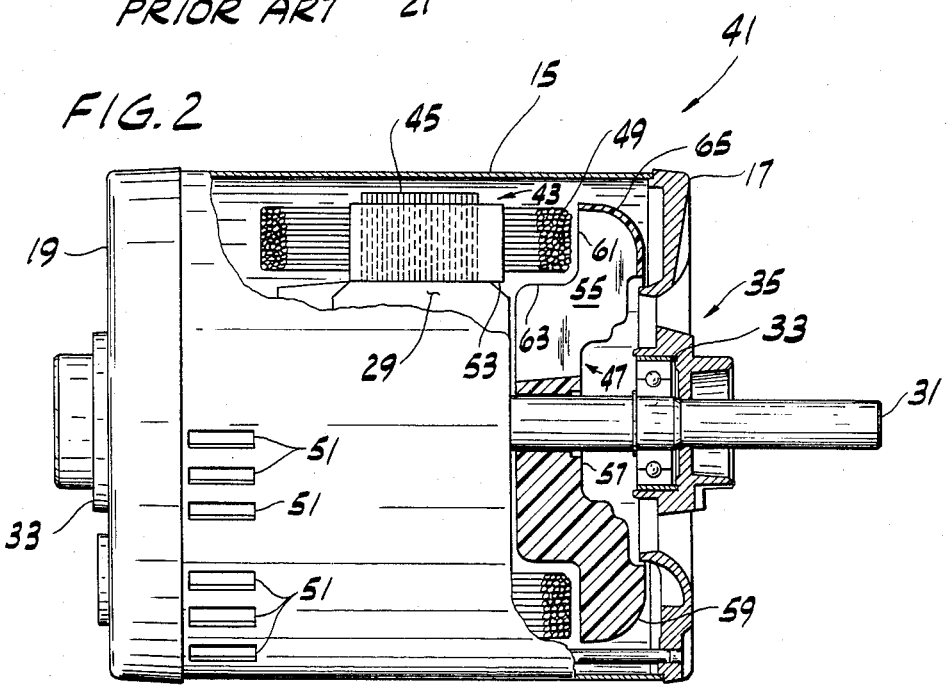
FIG. 2
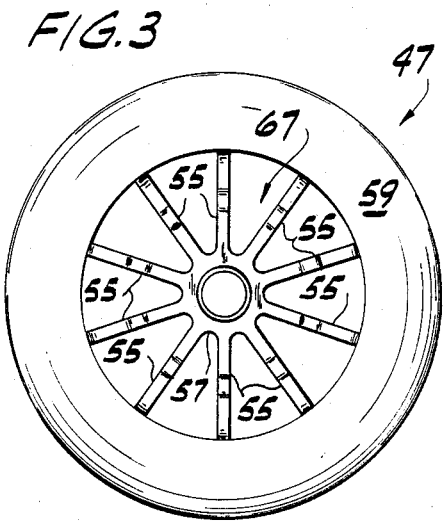
FIG. 3
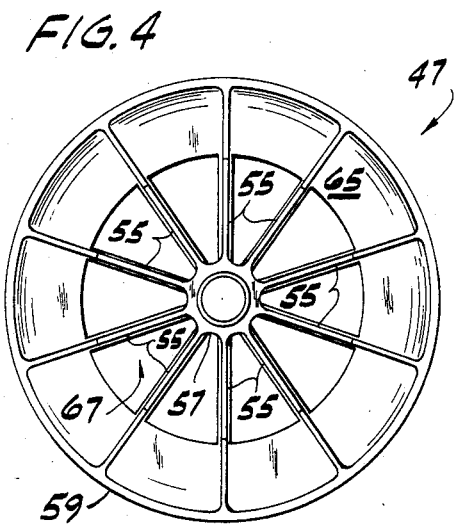
FIG. 4

ELECTRIC MOTOR WITH SHROUDED FAN

BACKGROUND OF THE INVENTION

This invention relates to dynamoelectric machines and more particularly to an internally mounted fan for a fractional horsepower electric motor.

Typically, a fractional horsepower electric motor includes a stator assembly having a stack of laminations (preferably made of sheets of suitable steel or other ferro-magnetic material) punched to have a central bore and a plurality of winding receiving slots extending generally radially outwardly from the bore. The laminations are stacked to form a core and are securely fastened together. A rotor assembly including a rotor, typically of squirrel cage design, and an axial shaft extending from both ends of the rotor is mounted in the stator. Specifically, the rotor is received within the bore of the stator core and centered therewithin. A substantially uniform air gap is disposed between the rotor and the portions of the stator core forming the bore. These motors typically include a pair of end shields secured to the ends of the stator assembly. The end shields each include a bearing in which one end of the rotor shaft is journalled so that the bearings rotatably support the motor within the stator assembly. Such motors are frequently enclosed in a motor shell which includes a motor frame and the two end shields.

In an enclosed motor of this type, it is desirable to provide some means for cooling the stator coils. These coils during operation have current flowing through them to generate a rotating magnetic field and this current generates heat in the stator coils. Excessive heat is of course undesirable and could lead to failure of the motor. As a result, various fans have been proposed in the past to cool the exposed portions of the stator coils. Such fans have generally been of cast metal construction, and as a result have had to be spaced a substantial distance from the stator coils themselves in order to provide sufficient electrical clearance. Such fans typically have had a generally closed metal back supporting a series of vanes. It is believed that the vanes in these previous designs provided substantially all of the air movement function of the fans.

Although these previous fans have worked well for their intended purpose, they could be improved. For example, some fractional horsepower electric motors have stator coils which extend past the rotor and as a result have both exposed end turns and exposed side portions of the stator coils which should be cooled. However, with many present fans, the air next to the exposed inner portion of the stator coil and in some cases the air next to the end turns themselves is relatively still or stagnant. That is, some present fans cause air to flow around the outside of the stator coils but are believed to allow air to remain stationary along the end turns and along the exposed inner portion of the stator coils. This results in generally adequate cooling of the outside of the stator coils but less than desirable cooling of the exposed inside portions and end turns of the stator coils. Since the current is the same in the outer portion of the stator coil and in the inner portion, one would want approximately the same air flow over both portions of the coil. Prior fans have also generally been constructed of metal. This provides a reliable fan but it does require that the fan be placed at least a certain distance from the coils in order to receive the approval of various agencies such as Underwriter's Laboratories. This additional spacing, however, results in reduced air flow at the coils themselves, which is less than desirable.

SUMMARY OF THE INVENTION

Among the various objects and features of the present invention is the provision of an electric motor with a fan which provides improved cooling air flow over the stator coils.

Another object of the present invention is the provision of such an electric motor which efficiently deflects cooling air over the stator coil windings.

Another object of the present invention is the provision of such an electric motor which creates turbulence along the exposed inner portions of the stator coil winding to improve cooling.

Another object of the present invention is the provision of such an electric motor with reduced clearance between the fan and the stator coils for improved cooling.

Other objects will be in part apparent and in part pointed out hereinafter.

Briefly, an electric motor of the present invention has a motor shell including a frame and at least one end shield. The motor shell carries at least one bearing support. A stator and a rotor are disposed inside the motor shell. The stator has a bore therethrough for rotatably receiving the rotor. The rotor has a shaft journalled in at least one bearing support of the motor. The stator further includes a plurality of coils of wire constituting the windings of the motor. The stator coils extend longitudinally past an end of the rotor so that the end turns and at least a portion of one side of the stator coils are exposed. A first air passageway in the motor shell is generally adjacent the rotor shaft at one end of the motor for admitting air to the interior of the motor shell for cooling the stator coils. A second passageway in the motor shell allows the cooling air to leave the motor. The second passageway is disposed generally on the opposite side of the stator coils from the first passageway. A fan is disposed inside the motor shell between the first passageway and the stator coils. The fan is secured to and driven by the rotor shaft to cause a flow of cooling air to pass over the stator coils when the motor is in operation. The fan has a plurality of vanes extending outwardly from a hub to a circumferential ring. The ring defines a central opening of the fan. The central opening extends past the vanes from the front to the rear of the fan so that the rear of the fan is relatively open. The inner surface of the ring is smoothly curved outwardly and rearwardly from the front of the central opening to form a skirt which directs air entering the central opening toward the stator coils. The vanes of the fan are disposed adjacent the exposed end turns and the exposed inner side portion of the stator coils to cause turbulent air to flow along the exposed end turns and inner side portions of the stator coils.

BRIEF DESCRIPTION OF THE DRAWINGS

FIG. 1 is a front elevation, with parts broken away for clarity, of a prior art electric motor with a cooling fan;

FIG. 2 is a front elevation, with parts broken away for clarity, of the electric motor with cooling fan of the present invention;

FIG. 3 is a front elevation of the cooling fan of the present invention; and

FIG. 4 is a rear elevation of the cooling fan of the present invention.

Similar reference characters indicate similar parts throughout the several views of the drawings.

DESCRIPTION OF THE PREFERRED EMBODIMENT

The prior art electric motor 11 shown in FIG. 1 has a cooling fan 13. This motor includes a motor shell composed of a motor frame 15, a first end shield 17 and a second end shield 19, end shield 17 and end shield 19 being disposed at opposite ends of the motor frame 15. The motor shell is suitably secured together by means of threaded fasteners, adhesive or the like. For example, a threaded fastener 21 is shown. Motor 11 further includes a stator 23 made up of a laminated stator core 25 and a plurality of coils of wire 27 which constitute the windings of motor 11. The stator coils 27 extend longitudinally past the end of a rotor 29 which is rotatably received in a bore of the stator. Because the stator coils extend past the end of rotor 29, the inner side portion of windings 27 is exposed to cooling air as are the end turns of stator coils 27. However, it has been found that the particular fan 13 shown tends to leave the air adjacent the inner surface of the stator coils and the end turns relatively undisturbed.

Rotor 29 is mounted for rotation on a shaft 31 which is journalled in a pair of bearing supports 33 at each end of motor 11. The bearing supports are secured in place by end shields 17 and 19. A first passageway or venturi 35 is disposed in end shield 17 to allow cooling air to flow into the interior of motor 11. A second passageway (not shown) is provided in end shield 19 to allow cooling air to leave the motor after it has passed around and through stator coils 27. Fan 13 is made of metal and is mechanically secured to shaft 31 as shown. It is typically thermally expanded and shrunk onto shaft 31. The fan includes a plurality of vanes 37 which have a solid back 39. With this particular construction, cooling air drawn in through venturi 35 is forced radially outwardly to the sides of motor shell 15. It should be noticed that the laminations of stator 23 extend radially out to motor frame 15 and hence block the flow of air. As a result, air which is forced outwardly by fan 13 must go through stator coils 27 or through rotor 29 to exit from the interior of motor 11. Although stator coils 27 are shown disposed only at one side of motor 11, it should be realized that this only for purposes of clarity. In actuality, the stator coils extend circumferentially around rotor 29.

Motor 41 (FIG. 2) of the present invention is similar in overall construction to the prior art motor 11. However, the stator 43 of the present invention include laminations 45 which do not extend all the way to the motor frame 15. That is, there are gaps or passages at certain points between the laminations and the motor frame for air to pass from venturi 35 through the fan 47 of the present invention, past stator coils 49, and through the passageway. After passing coils 49 the air exits through a second series of passageways 51. Although the passageways are shown as perforations 51 in frame 15, any other suitable passageway could be used to allow the cooling air to exit from the interior of motor 41. Also shown in FIG. 2 are standard plastic insulators 53 which are wrapped around the wires in each particular slot in the stator core. This construction leaves the rightmost inner portion of the stator coils 49 and the end turns thereof exposed to cooling air.

Fan 47 is a low pressure fan, since air can be forced through the gaps between laminations 45 and motor frame 15. The fan includes a plurality of vanes or ribs or fins 55 which extend outwardly from a hub 57 to a circumferential ring 59 which is disposed at the front and outer edges of fan 47. The fan itself is secured to motor shaft 31 by a friction fit. The fan is made of thermoset polyester to provide light weight and the possibility of a secure friction fit. In addition, because the fan is made of a plastic (insulator), closer tolerances than that possible with a metal fan such as the one shown in FIG. 1 are achievable. That is, since fan 47 is of plastic, there is no substantial possibility of the stator coils 49 being shorted to fan 47. For that reason the clearance between fan 47 and the stator coil is much shorter (as shown in FIG. 2) than the clearance for the prior art motor and fan (FIG. 1).

The ribs of fan 47 are disposed relatively close to venturi 35 to provide exceptional efficiency for driving the cooling air over the stator coils. Each vane includes an L-shaped portion having a back 61 and a foot 63. Back 61 is disposed adjacent the end turns of stator coils 49 to ensure that the air adjacent those end turns is turbulent, thereby preventing the formation of any still or stagnant air in that location. Similarly, foot 63 of each vane is disposed adjacent the exposed inner side portions of stator coils 49 to break up by turbulence any still air which might otherwise occur at that location. The circumferential ring forms a skirt 65 which extends outwardly and rearwardly from the front of the fan to direct air entering through venturi 35 toward stator coils 49. More particularly, the circumferential ring 59 defines a central opening 67 (see FIGS. 3 and 4) which extends past vanes 55 from the front to the rear of the fan 47. This provides a relatively open rear of the fan and makes fan 47 a low pressure fan. As seen in FIGS. 2 and 4, the inner surface of ring 59, which forms skirt 65 is smoothly curved outwardly and rearwardly from central opening 67 so that the skirt acts as a baffle to deflect the air over the motor windings where it provides the most cooling. The innermost portion of ring 59 is disposed adjacent a lip on end shield 17 to form a pressure seal between the fan and the end shield, to prevent air from flowing around fan 47 instead of through the fan.

Skirt 65 of ring 59 is substantially uniform in longitudinal cross-section around the ring so that air entering fan 47 is distributed evenly by the fan to the exposed portions of stator coil 49. Air which does impinge upon skirt 65 is directed generally longitudinally along the motor to the stator coils 49. As can be seen in FIG. 2, the hub 57 of fan 47 is offset longitudinally with respect to ring 59 so that the hub is adjacent rotor 29 and the ring 59 is spaced from the rotor both longitudinally and radially. This particular construction allows the air near the inner exposed surface of stator coils 49 to be readily broken up so that cooling air can flow around all exposed portions of the stator coil. Each vane extends radially outward from hub 57 until it reaches the vicinity of the inner exposed portion of stator coils 49. At that point each vane extends longitudinally as shown at 63 along the exposed inner side portion of the stator coils. Once the stator coils are cleared, the section labeled 61 extends radially along the exposed end turns of the stator coil. Thus it can be seen that this particular construction results in virtual elimination of dead air adjacent the exposed portions of stator coils 49. This is accomplished in a relatively simple construction which is readily fabricated from thermoset polyester material.

Tests have revealed the superiority of the fan 47 of the present invention over prior fans. For example, the stator coil temperature was measured for a prior art fan and the average temperature rise was found to be 53° C. Using the improved cooling fan of the present invention, the average stator coil temperature was found to be approximately 4° C. less. Of course, the even cooling provided by the present fan, because of the cooling of the exposed inner side portions and end turns of the coils, gives advantages which are even more striking than the average temperature reduction.

In view of the above it will be seen that the various objects and features of the present invention are achieved and other advantageous results are obtained.

As various changes could be made in the above constructions and method without departing from the scope of the invention, it is intended that all matter contained in the above description and shown in the accompanying drawing shall be interpreted as illustrative and not in a limiting sense.

What is claimed is:

1. In an electric motor having a motor shell including a frame and at least one end shield, said motor shell carrying at least one bearing support, a stator and a rotor disposed inside the motor shell, the stator having a bore therethrough for rotatably receiving the rotor, the rotor having a shaft journalled in at least one bearing support of the motor, the stator further comprising a plurality of coils of wire constituting the windings of the motor, said stator coils extending longitudinally past an end of the rotor so that the end turns and at least a portion of one side of the stator coils are exposed, a first air passageway in the motor shell generally adjacent the rotor shaft at one end of the motor for admitting air to the interior of the motor shell for cooling the stator coils, and a second passageway in the motor shell for allowing the cooling air to leave the motor, the second passageway being disposed generally on the opposite side of the stator coils from the first passageway, the improvement comprising:

a fan disposed inside the motor shell between the first passageway and the stator coils, said fan being secured to and driven by the rotor shaft to cause a flow of cooling air to pass over the stator coils when the motor is in operation, the fan having a plurality of vanes extending outwardly from a hub to a circumferential ring, which ring defines a central opening of the fan, said circumferential ring being secured to at least some of said vanes to rotate therewith, said central opening extending past the vanes from the front to the rear of the fan so that the rear of the fan is relatively open, the inner surface of the ring being smoothly curved outwardly and rearwardly from the front of the central opening to form a skirt which directs air entering the central opening toward the stator coils, the vanes being disposed adjacent the exposed end turns and the exposed side portion of the stator coils to cause turbulent air to flow along said exposed end turns and side portions of the stator coils.

2. The electric motor as set forth in claim 1 wherein at least one vane has a generally L-shaped section, the back of the L-shaped section being disposed adjacent end turns of the stator coils to cause turbulent air to flow past the end turns, and the foot of the L-shaped section being disposed adjacent the exposed side portion of the stator coils to cause turbulent air to flow past said exposed side portion, said fan ring terminating adjacent the outermost part of the L-shaped vane section.

3. The electric motor as set forth in claim 1 wherein the inner surface of the ring at the rearmost extent of the ring is shaped to direct air impinging thereon generally longitudinally toward and along the stator coils.

4. The electric motor as set forth in claim 1 wherein the fan is an integral molded part.

5. The electric motor as set forth in claim 1 wherein the hub of the fan is offset longitudinally with respect to the ring so that the hub is adjacent the rotor and the ring is spaced from the hub both longitudinally and radially.

6. The electric motor as set forth in claim 1 wherein the inner portion of the circumferential ring forms a pressure seal in cooperation with the end shield to cause cooling air to preferentially pass through the fan as opposed to around the fan.

* * * * *